P. Stillman,
Pressure Gage.
No. 205. Reissued July 29, 1851.
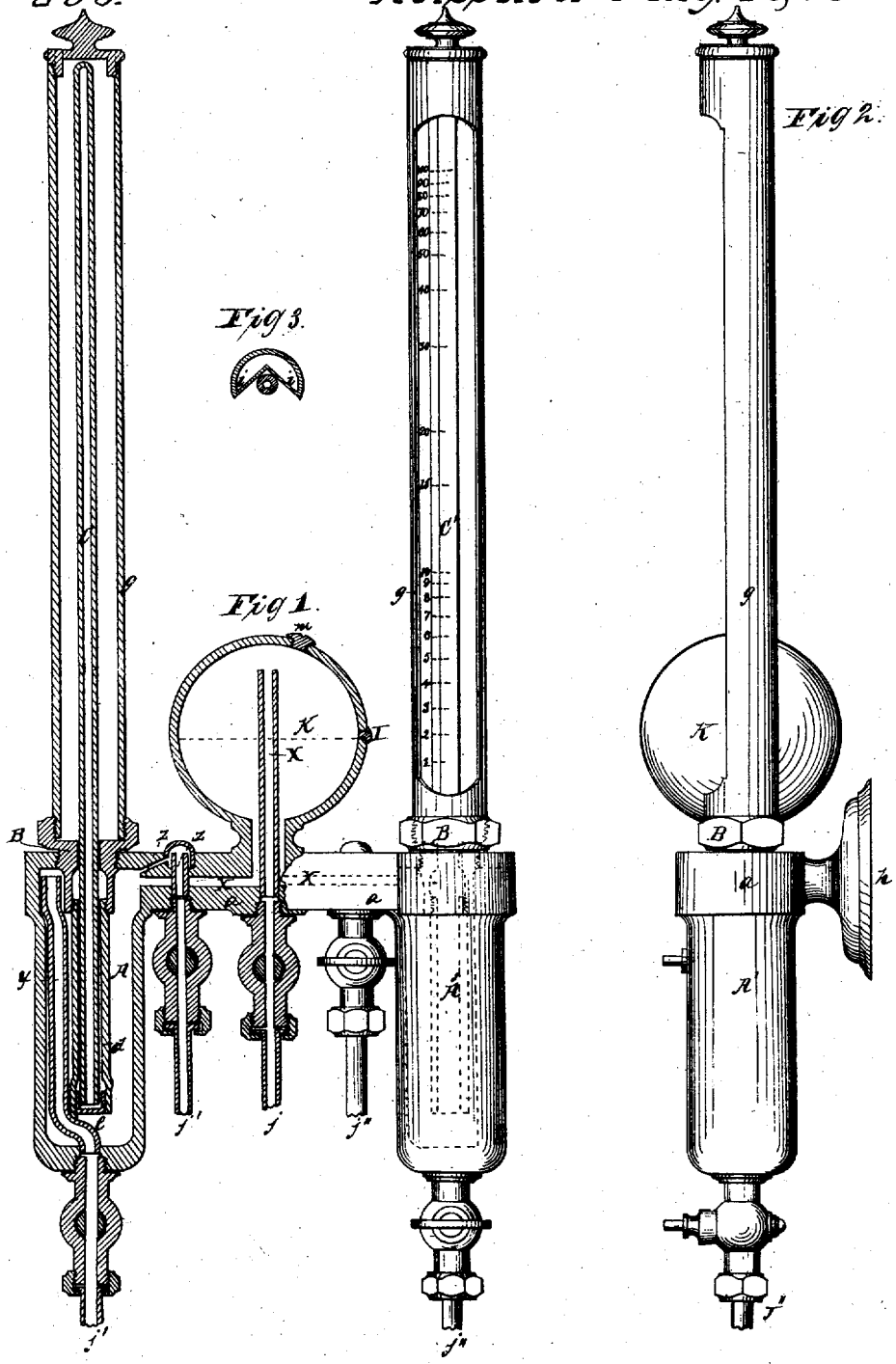

UNITED STATES PATENT OFFICE.

PAUL STILLMAN, OF NEW YORK, N. Y.

IMPROVEMENT IN STEAM AND VACUUM GAGES.

Specification forming part of Letters Patent No. 5,552 dated May 9, 1848; Reissue No. 205, dated July 29, 1851.

*To all whom it may concern:*

Be it known that I, PAUL STILLMAN, of the city, county, and State of New York, have invented a new and useful improvement in the manometer or gage for determining the pressure of steam and the extent of vacuum in steam boilers and engines, but which may be applied separately to ascertain either the pressure of the steam or the extent of vacuum in steam-engines, boilers, vacuum-pans, &c., and I do hereby declare that the following is a full, clear, and exact description of the principles or character which distinguishes it from all other things before known, and of the manner of making, constructing, and using the same, reference being had to the accompanying drawings, making part of this specification, in which—

Figure 1 is a front elevation of my improved instrument, with one-half of it represented in section to show the internal arrangement; Fig. 2, a side elevation, and Fig. 3 a horizontal section of one of the tubes with the surrounding case and scales.

The same letters indicate like parts in all the figures.

The first part of my invention consists in combining with the reservoir of mercury at the lower end of the tube of the gage a second reservoir of mercury, elevated above the first and communicating with it. This causes the top of the mercurial column to be visible above the opening in the case of the instrument when the mercury stands at the lowest possible point—viz., in vacuum-gages the point where a perfect vacuum is indicated; in steam-gages the point where an entire absence of pressure is indicated.

The second part of my invention consists in placing around the lower end of the glass tube a hollow metallic cylinder which screws into the tube-holder above and extends below beyond the end of the glass tube far enough to allow a metallic cap to be screwed into its lower end, and thus close it, but not so tight as to prevent the mercury from pressing between the threads of the screw. This serves three purposes: First, as a gland to tighten the packing placed above its upper end around the glass in a stuffing-box provided for the purpose in the tube-holder; second, to protect from injury the end of the glass tube below the tube-holder; third, to facilitate the filling of the tube, and to prevent, by the narrowness of the passage between the threads of the screws, all excessive oscillations of the mercurial column in the tube. To facilitate the passage of the mercury, I tin the threads of the screws, which also serves the purposes indicated in the next section.

The third part of my invention consists in the methods I adopt to prevent the water, (arising from condensed steam,) which almost always rests upon the surface of the mercury in the reservoir, from insinuating itself into the glass tube, and thus finding its way above the mercurial column. This I do in two ways, either, first, by tinning the exterior of this hollow cylinder spoken of in the last section, if made of iron, or washing it with mercury, if of copper, and thus establishing so close an affinity between the surface of this cylinder and the mercury in the reservoir that no water can insinuate itself between them; or, second, by plunging the tube so deeply into the mercury in the reservoir that no water will pass between the mercury and the cylinder.

The last part of my invention consists in my mode of preventing the oxydation of the mercury in the tube, and, consequently, soiling of the glass, which I do, either, first, by introducing into the tube above the mercury some fluid—such as naphtha, which contains no oxygen—or, second, by filling the tube, not with atmospheric air, but with some gas which is free from oxygen.

In the accompanying drawings, A represents a sole-piece, to which all the main parts of the instrument are attached, and provided at the back side with a flange piece, *h*, by which the instrument can be secured in place. From the under surface of this sole-piece project downward two hollow reservoirs, A A′, one near each end, and made of such length and diameter inside as to contain the requisite quantity of mercury for the working of the instrument. To the upper surface is properly secured a spherical or other formed bulb or chamber, K, which communicates by a hole through the bottom thereof and through the sole-piece (see dotted lines) with the reservoir A′. A pipe, X, passes through the sole-piece, and extends up into and near the top of the bulb, and a pipe, J, provided with a stop cock, is secured to the bottom of the sole-piece, so as to form a continuation of the pipe X, and to extend to the boiler or other steam-vessel, in order that the steam may pass into the bulb or chamber K and communicate its pressure to the surface of the mercury contained therein. The other reservoir, A, communicates by a hole, Z, in the sole-piece with a vertical pipe, *i*, also provided with a stop-cock, which pipe is to communicate with the condenser, or any other vessel in which the degree of exhaustion or vacuum is to be measured.

In each of the reservoirs A A′ is to be inserted the open end of a glass tube, C C′, the one, C, to measure the degree of exhaustion or vacuum in the condenser, and the other, C′, the pressure of steam in the boiler; and as these tubes are both inserted in their appropriate reservoirs in the same way, the description of one of them will be sufficient. The glass tube is inserted into a metallic tube-holder, B, that is tapped into the upper surface of the sole-piece, and for the purpose of securing the glass tube therein sufficiently tight the lower end of the holder is enlarged and tapped so as to form a stuffing-box, and to receive the upper end of a hollow metal cylinder, *d*, made of iron or copper, and by screwing this up into the tube-holder the packing is compressed around the glass tube. The lower end of this metallic cylinder *d* extends down a little below the end of the glass tube to receive a screw-cap, *e*, which is either provided with a small hole, *f*, or screwed into the gland with a loose thread, so as to allow sufficient passage for the mercury through it, and thus to establish a communication between the reservoir and the inside of the tube, yet so small as to prevent any sudden variation of pressure from producing a prejudicial degree of oscillation. This cylinder *d* also protects the glass and facilitates the filling of the tube, when used as a vacuum-gage, with mercury, which is done in the following manner: After the tube has been secured in the holder it is inverted and filled with mercury. The screw-cap *e* is then screwed in, and any air that may be in the cylinder *d* or cap *e* finds its way out through the hole *f*, which should, however, be very small, just large enough to permit the escape of the air, or, what is more safe, large enough to admit a screw to close it quite tight. The tube is then turned up again and inserted into the reservoir, the escape of the mercury being prevented by the passage through the interstices of the screw, or the hole just mentioned being too small to admit the air to displace the mercury, so that the operation of inverting and inserting the tube is not attained with any difficulty. If the column of mercury in the tube is higher than will be sustained by the atmosphere, it will gradually ooze out from the tube into the reservoir until the proper level has been established, leaving a vacuum in the upper end, which has been hermetically sealed. Of course, so long as the pressure in the tube *j′* is equal to the atmosphere, the mercury will be sustained in the tube C at the height due to that pressure; but as the condenser is exhausted the mercury, being unsupported, will descend a corresponding amount, and thus show the extent of such exhaustion on a scale properly marked and screwed to the metallic case *g*, which partly surrounds the glass tube, the lower end of which is secured into the upper end of the tube-holder. As there is no affinity between the mercury and the surface of the cylinder *d*, air and moisture gradually find their way between the mercury and the surface of the cylinder and through the threads or hole of the screw-cap *e*, and thence rise into the upper part of the tube, and thus derange the instrument. To prevent this, as I before stated, I tin the outside surface of the cylinder *d*, if made of iron, or wash it with mercury, if of copper, in order to establish a sufficient affinity between its surface and the mercury in the reservoir, and thus effectually cut off the passage of air and moisture. The other tube, C′, is, as stated above, secured in the tube-holder B in the same manner. It is, however, differently prepared for use—that is to say, it is to be filled in part with air, or any elastic gas, and in part with mercury. As the instrument is constructed to act upon the principle of condensing the gas contained within the tube, and as from several causes—such as variation of temperature, or absorption, or decomposition—this quantity is liable to be changed in volume, it is evident that it should be so constructed that its initial quantity or zero-point should be always determinable. To effect this end, two methods are pursued, either of which is alike efficacious: first, by compressing the air within the tube by an elevated column of mercury; secondly, by partially exhausting the air or gas from the tube. This I do by filling the tube with mercury to a fixed point, so that when inverted it shall be subjected to less than the atmospheric pressure; or I can do it by the use of an air-pump, from which the desired quantity of air may be exhausted. Therefore, whether the bulb be used or not is immaterial to this part of my invention, so long as the reservoir is of sufficient depth or capacity to prevent the expansion of the air in the tube, when the steam is condensed in the boiler, from forcing all of the mercury out of the tube, and so disturbing the zero-point or the initial quantity of gas. The pipe X, which communicates from the steam-boiler to the bulb K, should extend some distance above the level of the mercury in the bulb, so that when a partial vacuum is effected in the boiler the tension of the air above the mercury in the tube C′ shall not force the mercury high enough in the bulb to pass over into the tube X. By the use of this bulb K it will be seen that a sufficient column of mercury may always be kept above the lower end of the tube C to prevent the tension of the air therein from forcing the mercury entirely out of it. The steam being admitted to the bulb or chamber K, the mercury is forced down through the pipe and into the reservoir, and from thence into the glass tube to any height proportional to the pressure, the amount of which is indicated by a scale, *i*, attached to the case. The scales *i i* for the tubes C C′ will, of course, differ, one indicating the vacuum and the other the pressure. The bulb or chamber K is provided with a screw-plug, *m*, through which the mercury can be introduced, and with another one, *l*, at the side to regulate the height to which it is to be filled. If a perfect vacuum were now formed within this bulb or chamber K, the mercury would fall to the same level in the tube as in the bulb or chamber K, which is out of view. Thus the level of the mercury in the tube, with a perfect vacuum, would always be visible above its insertion in its case. When used for pressure, it is usual to fill them with air, but atmospheric air oxidizes the mercury, and the oxide is attached by the pressure to the surface of the tube, and the consequence is that in a short time the glass becomes so darkened that the level of the mercury cannot be seen. To prevent this, I introduce into the upper part of the glass tube C a few drops of naphtha, or any other liquid which contains no oxygen or is otherwise inoperative upon the mercury, and which will float on its surface; or I charge the tube with any gas that does not contain oxygen, and thus prevent the oxidizing effects of the mercury in the glass tube C of the steam-gage, and thus preserve the transparency of the glass. This is not necessary in the vacuum gage, as there is a perfect vacuum and, of course, no oxygen in the upper part of that tube.

As that part of the instrument which measures exhaustion in the condenser is not generally required to indicate more than twenty-eight inches, and therefore only an approximation to a perfect vacuum, I usually make that part of the instrument without the elevated reservoir, as described above, and represented in the accompanying drawings, because when the mercury is drawn down to the lowest point within the capacity of the working of the air-pump the level of the mercury in the tube will be visible in the tube above the place of its insertion in the tube-holder and reservoir; but when the instrument is to be used to measure the pressure in a vessel in which a perfect vacuum is to be, then I provide the instrument with the elevated bulb or chamber K, as described.

That part of the instrument which measures the pressure of the steam may also be used without the elevated bulb or chamber K by connecting the reservoir with the boiler or other steam-vessel by means of a pipe, *j′*, in manner similar to the vacuum-gage described above, in which case the air is partially exhausted, as before described, so as to elevate the mercury at the zero-point to a place within the tube susceptible of observation.

It may be well to add that, if desired, when the bulb or bulbs K are not used the tubes J and J′, instead of being inserted in the sole-piece, may be passed through the lower end of the reservoirs A A′ and carried up to the upper end thereof, as shown in the accompanying drawings, or inserted directly into the top of the reservoir, as may be most desirable.

It will be obvious from the foregoing that this instrument may be divided, and that for high-pressure steam-engines, or any other purpose which requires only the indication of the pressure of steam, the vacuum gage may be dispensed with, and so of the other part of the instrument; but for condensing-engines the entire instrument is required, as the actual pressure of the steam can only be ascertained by comparing it with the vacuum in the condenser, the effective pressure on the piston being dependent on this vacuum.

What I claim as my invention, and desire to secure by Letters Patent, is—

1. The combining with the reservoir of mercury at the lower end of the tube an elevated chamber forming part of the reservoir, substantially as herein described, so that the zero-point may be high enough to be visible above the reservoir, as herein described, and also that the air contained in the tube, being condensed by the pressure of the mercury in the elevated chamber, may furnish more desirable divisions on the scale when very high pressures are to be indicated.

2. The producing a partial vacuum in the tube of the steam-gage at the time of filling it with mercury, for the purpose of bringing the zero-point high enough to be visible above the reservoir, and also in order to prevent any partial vacuum produced in the boiler from drawing all the mercury out of the tube.

3. Surrounding the lower end of the glass tube with a metallic cylinder provided with a cap or plug at its lower end for protecting the glass tube, and allowing the mercury only to pass slowly either through a very small hole or between the threads of the screw, and thus establishing a connection between the reservoir and the boiler, substantially in the manner and for the purpose above specified.

4. The method of preventing the air or moisture from passing between the mercury and the cylinder *d* into the tube, either by tinning the cylinder or washing it with mercury, or by plunging it deeply into the mercury, as above described.

5. Preventing the inside of the tube from being soiled with oxidized mercury, by either placing on the surface of the mercury in the tube some fluid (such as naphtha) which does not act perceptibly upon mercury, or by filling the tube with gas, as herein made known.

PAUL STILLMAN.

Witnesses:
DANIEL BOWLY,
J. L. BOSSWORTH.